July 31, 1956     E. BUSDIECKER     2,756,991
SELF-CONTAINED AUTOMOBILE WINDOW ACTUATOR
Filed July 9, 1953     2 Sheets-Sheet 1

INVENTOR.
ELMER BUSDIECKER
BY
ATTORNEY

July 31, 1956     E. BUSDIECKER     2,756,991
SELF-CONTAINED AUTOMOBILE WINDOW ACTUATOR
Filed July 9, 1953     2 Sheets-Sheet 2
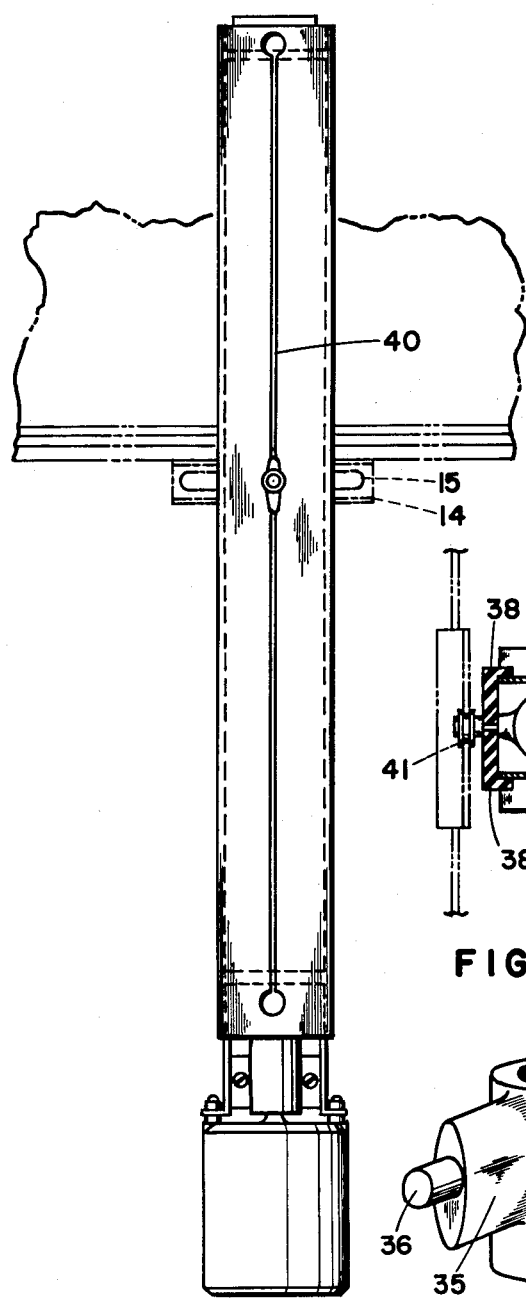
FIG. 3
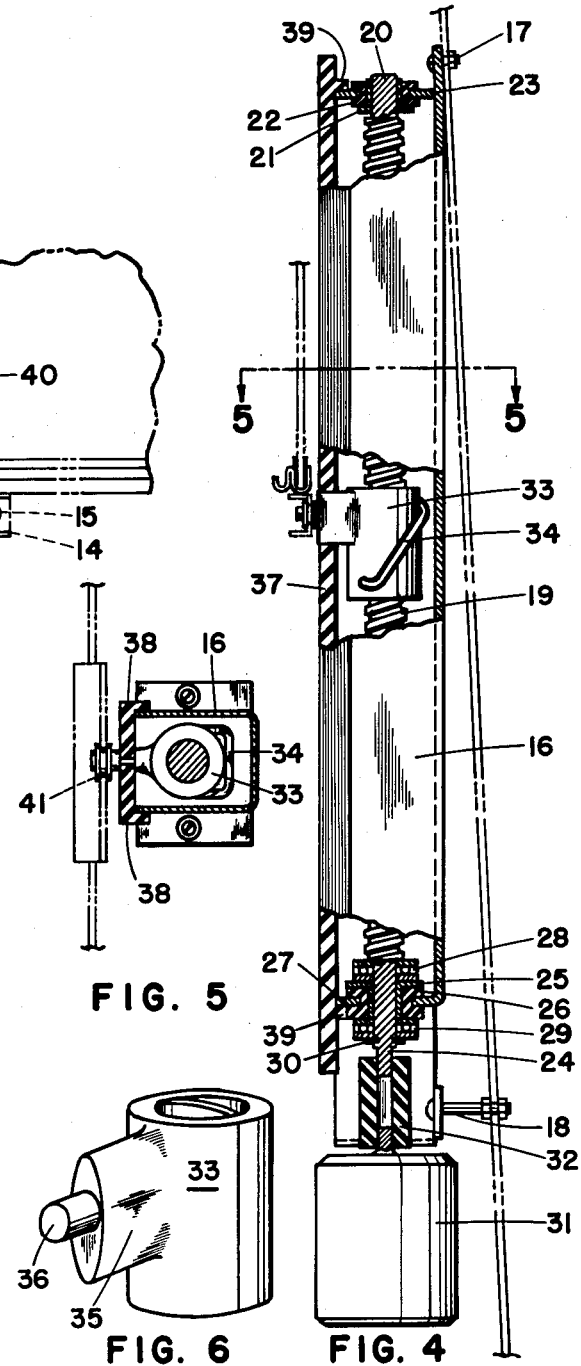
FIG. 5
FIG. 6
FIG. 4
INVENTOR.
ELMER BUSDIECKER
BY
ATTORNEY United States Patent Office 2,756,991
Patented July 31, 1956

2,756,991

SELF-CONTAINED AUTOMOBILE WINDOW ACTUATOR

Elmer Busdiecker, Cleveland, Ohio, assignor to The Cleveland Pneumatic Tool Company, Cleveland, Ohio, a corporation of Ohio Application July 9, 1953, Serial No. 366,988

1 Claim. (Cl. 268—133)

This invention relates broadly to window actuating mechanisms, but more particularly to such power actuating mechanisms especially suitable, but not necessarily limited, to the opening and closing of automobile windows and of other self-propelled vehicles.

One object of this invention is to produce a power operated automobile window actuator, designed as a self-contained compact unit, readily installed.

Another object of this invention is to enclose such actuator in a box-like support entirely protecting the movable parts thereof from dust and other deleterious matter.

Another object of this invention is to produce a power operated automobile window actuator that is positive in action, susceptible of convenient and positive controls, easily installed, relatively simple, economical to manufacture and of general superiority and serviceability.

Other objects of this invention will be apparent from the following detailed description wherein similar characters of reference designate corresponding parts, and wherein:

Figure 3 is an enlarged view of the device as shown in Figure 1.

Figure 4 is an enlarged view of the device as shown in Figure 2 with portions either broken away or in section to show details of construction.

Figure 5 is a cross-sectional view taken on line 5—5 in Figure 4 and looking in the direction of the arrows.

Figure 6 is an enlarged perspective view of one part of the device.

Figure 1:
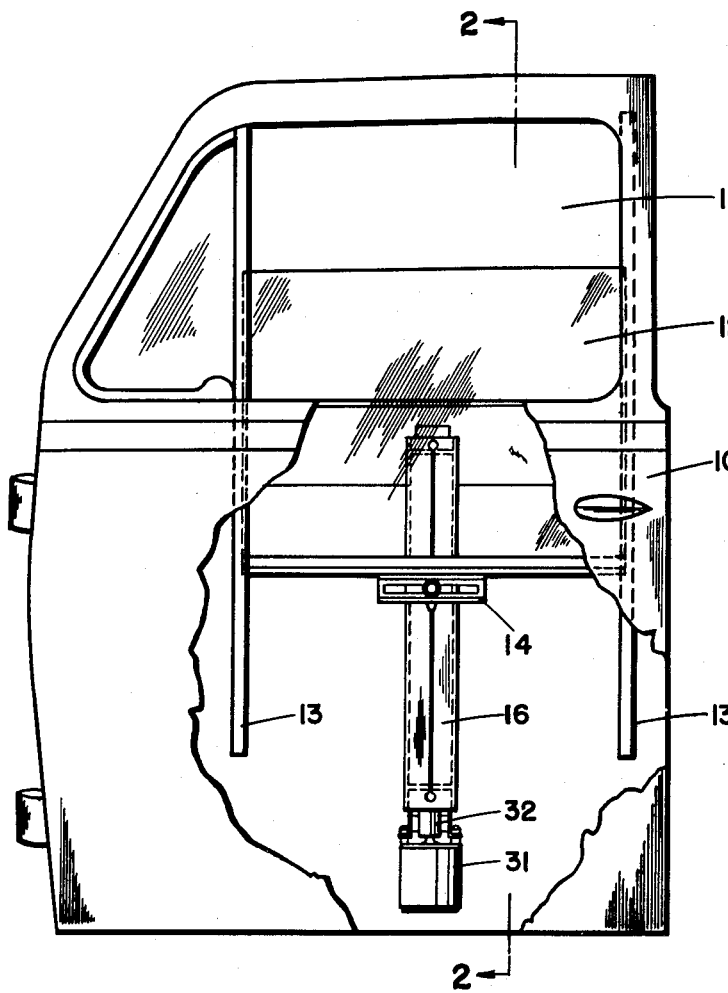
Figure 1 is a front elevational view of an automobile door with the front panel thereof partly removed, illustrating a practical application of the invention.
Figure 2:
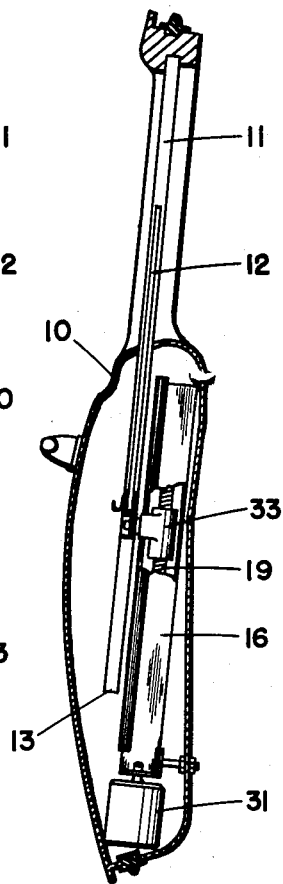
Figure 2 is a longitudinal sectional view taken on line 2—2 in Figure 1, and looking in the direction of the arrows.

Referring to the drawings, 10 designates an automobile door having a window opening 11 and a pane, hereinafter called window 12, running in parallel channels 13 fixed to the door. As is customary in automobiles, the window 12 is frameless except for a slotted metal runner 14 fixed to its lower side, with its slots 15 extending longitudinally thereof.

An elongated housing, in the form of a metal box 16, of U-shaped cross section, is mounted vertically between the two door panels, and has its upper end fixed to the inner panel by a bolt 17 and its lower end by similar bolts 18. An upright ball-screw 19 is operatively mounted in the box 16. Its upper shafted end 20 is journaled in a bearing 21 fixed within a resilient bushing 22, which is carried by a fixed cross plate or upper end 23 of the box 16. The lower shafted end 24 of the screw is similarly journaled in a bearing 25, fixed within a resilient bushing 26, which is carried by a fixed cross plate or lower end 27 of the box 16.

The axial thrust of the screw is taken by the lower end of the box through the agency of upper and lower thrust bearings 28 and 29, the upper one being located between the inner end of the shafted portion 24 and the bearing 25, while the lower one is retained against bearing 25 by a spring clip 30.

A small reversible electric motor 31 has its shaft connected to the screw 19, below the lower end of the box 16, through a resilient coupling 32.

A nut 33 is operatively mounted on the screw 19 for longitudinal movement thereon upon its rotation in one or the other direction. The nut is preferably of the free running ball type, that is, its threads together with the threads of the screw, define helical channels filled with balls carried by the nut, and returned from one to the other end thereof through a return tube 34. Nut 33 is formed with a stud 35 extending radially thereof, and ended by a reduced terminal 36. The cross section of the stud 35 is substantially oblong with inverted V-shaped ends located on a line parallel to the axis of rotation of the screw 19.

A resilient lid 37, preferably made of rubber or rubber composition, closes the otherwise open side of the box 16. This lid has longitudinally extending lips 38 fitting snugly over the side walls of the box as clearly shown in Figure 5, and transversal end lips 39 fitting snugly over the box end walls 23 and 27. This lid has a slit 40 extending substantially the full length thereof, through which protrudes, for slidable movement therein, the stud 35 of the nut 33. The terminal 36 of the stud, which is located outside of the box 16, extends into a resilient bushing 41 mounted within the slot 15 of the window runner 14. This bushing is designed to fit over the runner 14 against accidental removal therefrom, but is relatively free to move longitudinally in the slot 15 to find is own axial alignment with respect to the screw 16.

Commercially the reversible motor 31 is connected to the electric power source of the vehicle, such as its battery, and controlled by appropriate switches for imparting rotation to the screw 19 in one or the other direction and effecting up or down movement to the nut 33, and consequently the closing or opening movement of the window 12. During longitudinal movement of the nut 33, its radial stud 35 is free to slide in the slit 40, which, by virtue of the elasticity of the material of the lid 37, will substantially close itself behind the extension 35. The inverted V-shape of the leading edge of the extension, irrespective of its direction of travel, assists in gradually opening the slit to enable longitudinal movement of the extension with minimum resistance.

From the foregoing description, it will be understood that the entire unit is contained within the box 16, which through the arrangement of the radial projection 35 slidable in the slit 40, remains substantially closed even during the operation of the unit, thereby protecting the working parts of the unit from dust and other deleterious foreign matter. This arrangement also results in a compact self-contained unit, easily installed, wherein all movable parts are resiliently supported and protectively enclosed in the box 16 to produce a device which is entirely free of vibration and noise and capable of quiet, smooth and efficient operation.

The details of structure and arrangement of parts shown and described may be variously changed and modified without department from the spirit and scope of the invention.

I claim:

In a device of the character described, an elongated rigid housing having an open side extending lengthwise thereof, a screw lengthwise in said housing, terminal support bearings for said screw, means adapted to impart rotary motion to said screw, a nut in said housing operatively engaging said screw for longitudinal movements thereon upon rotary motion of said screw, a resilient lid mounted on the open side of said housing formed with a slit extending lengthwise thereof providing opposed surfaces resiliently engaging by virtue of the resiliency of the lid, a stud extending laterally from said nut through said slit deflecting said surface apart only at said stud whereby said slit is closed on both sides of said stud and prevents foreign matter from entering into said housing while permitting a movement of said nut and stud along said screw.

References Cited in the file of this patent

UNITED STATES PATENTS

| | | |
|---|---|---|
| 1,495,426 | Myers | May 27, 1924 |
| 2,022,848 | Fuller | Dec. 3, 1935 |
| 2,115,424 | Lesti | Apr. 26, 1938 |
| 2,124,037 | Lavigne | July 19, 1938 |
| 2,331,048 | Schaaff | Oct. 5, 1943 |
| 2,589,488 | Fowler | Mar. 18, 1952 |